(12) United States Patent
Dooley

(10) Patent No.: US 7,701,681 B2
(45) Date of Patent: Apr. 20, 2010

(54) SYSTEM AND METHOD FOR MITIGATING AN ELECTRICAL ARC FAULT

(75) Inventor: Kevin A. Dooley, Mississaga (CA)

(73) Assignee: Pratt & Whitney Canada Corp., Lonqueuil, Quebec (CA)

(*) Notice: Subject to any disclaimer, the term of this patent is extended or adjusted under 35 U.S.C. 154(b) by 102 days.

(21) Appl. No.: 12/038,001

(22) Filed: Feb. 27, 2008

(65) Prior Publication Data

US 2009/0213509 A1    Aug. 27, 2009

(51) Int. Cl.
*H02H 9/00* (2006.01)
(52) U.S. Cl. ................................................. 361/54
(58) Field of Classification Search ............... 361/54, 361/55

See application file for complete search history.

(56) References Cited

U.S. PATENT DOCUMENTS

| | | | | |
|---|---|---|---|---|
| 3,569,784 | A * | 3/1971 | Carroll et al. | 361/55 |
| 4,156,264 | A * | 5/1979 | Hoover | 361/56 |
| 5,805,394 | A * | 9/1998 | Glennon | 361/20 |
| 6,532,140 | B1 * | 3/2003 | McMahon et al. | 361/54 |

FOREIGN PATENT DOCUMENTS

EP    1 764 908    8/2006

* cited by examiner

*Primary Examiner*—Ronald W Leja
(74) *Attorney, Agent, or Firm*—Ogilvy Renault LLP

(57) ABSTRACT

A method and apparatus for mitigating arc faults in a power generation system includes reducing and/or eliminating voltage when an arc is present, to protect the system from associated damage.

10 Claims, 4 Drawing Sheets

SYSTEM AND METHOD FOR MITIGATING AN ELECTRICAL ARC FAULT

CROSS-REFERENCE TO RELATED APPLICATIONS

This is the first application filed for the present application.

TECHNICAL FIELD

The present description relates to the field of electrical power management systems.

BACKGROUND

When arc faults occur in electrical circuits, damage is often done to wires, insulation and other surrounding electrical components. This is particularly true in direct current (DC) generators, which makes the use of DC generators in high voltage/current applications problematic, particularly in aircraft-based power systems.

Some existing arrangements, such as arc fault breakers, open-circuit the power source, upon detecting an arc fault, to effectively disconnect the external circuit from the power source, however, this arrangement does not protect arc faults from occurring within the circuitry of the power source, such as in an electrical generator or an associated rectifier circuit.

There is a need to provide for an improved methods and systems for protecting against the potential damage caused by arc faults.

SUMMARY

Accordingly, there is described a system for mitigating an electrical fault, the system comprising: a power source having an output terminal connected to a load, said power source providing regulated current to the load; a sensing device (also referred to as a sensing system) at the output terminal for detecting the electrical arc fault; and a switching device at the output terminal for reducing a potential difference at the output terminal upon detection of the electrical arc fault by the sensing device.

There is also described a method for mitigating an electrical arc fault, the method comprising: providing regulated current at an output terminal and to a load; detecting the electrical arc fault; and reducing a potential difference at the output terminal upon detecting the electrical arc fault.

There is yet also described an apparatus for mitigating an electrical arc fault, the apparatus comprising: means for providing regulated current to an external circuitry, the means for providing having output means; means for detecting the electrical arc fault, said means for detecting being located at the output means; and means for reducing a potential difference at the output means upon detection of the electrical arc fault by the means for detecting.

BRIEF DESCRIPTION OF THE DRAWINGS

Further details will be apparent from the following detailed description, taken in combination with the appended figures, in which.

It will be noted that throughout the appended drawings, like features are identified by like reference numerals.

DETAILED DESCRIPTION

Figure 1:
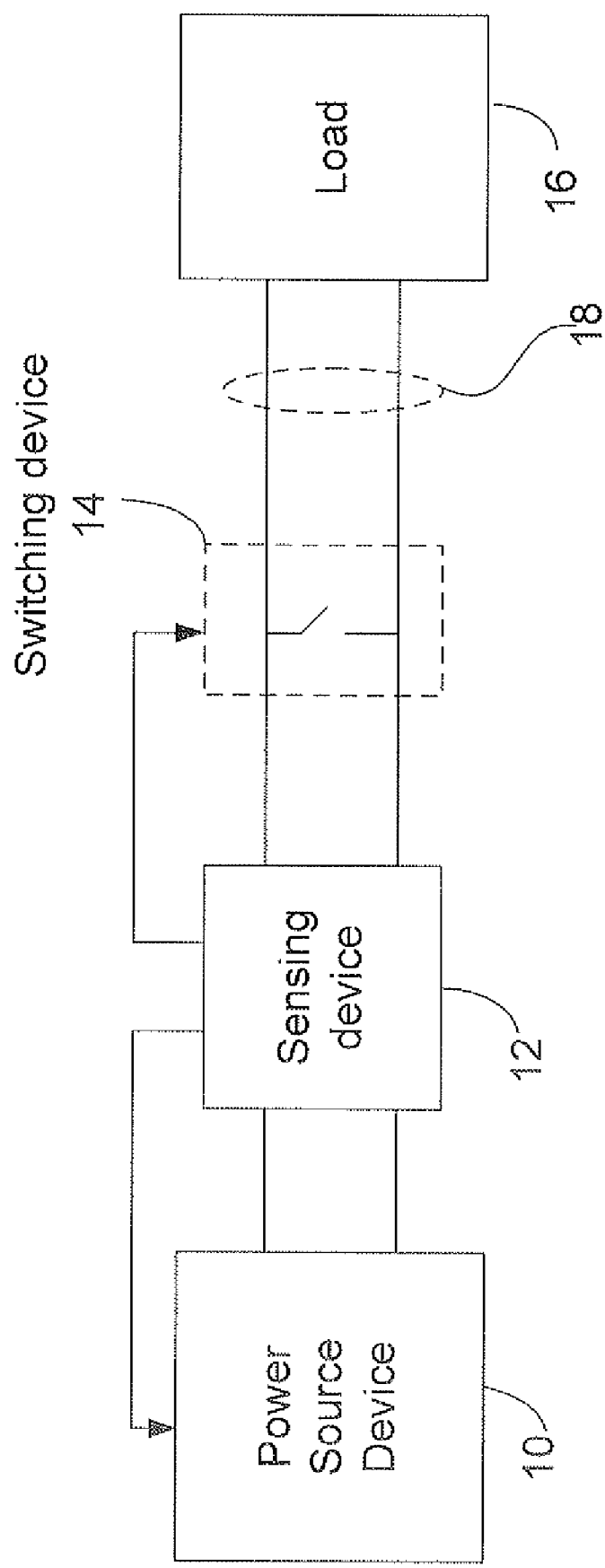
FIG. 1 is a schematic view of a system for mitigating an electrical arc fault according to an embodiment.

FIG. 1 illustrates the components of a system for mitigating an electrical fault. The system has a power source 10, a sensing device 12, a switching device 14 and an external circuit device or load 16.

The power source 10 optionally has a power generator and current regulating means. In the described examples, power source 10 is a direct current (DC) power source. DC power sources often tend to be more sensitive to arc fault damage.

The sensing device 12 has an electrical fault detection circuit such as an arc detection circuit to detect the initial occurrence of an arc fault. The sensing device 12 also has circuitry (not shown) which controls the switching device 14. Any suitable arc sensing approach may be employed to provide sensing device 12, such as an electronic switching arrangement employing MOSFET or IGBT devices, and the manner in which an arc is sensed or detected in the system is not described herein as any known method or device can be used.

In use, when an arc fault is detected in the power source 10 or its associated systems, a signal is sent to the switching device 14 to close the switch, creating a short circuit across the power source 10. The short circuit shorts the DC supply provided at the output of the power source 10. Hence, once the switch is closed, the voltage across the load is removed without overloading the power source 10, thereby protecting both the load 16 and the power source 10 from an arc fault. Since an arc fault requires a voltage difference to sustain it, the fault is inherently nullified.

The sensing device 12 also returns operating currents to the power source 10 such that when a fault occurs and the switch is closed, the current output by the power source 10 remains regulated and under control, as will be described further below. The switching device 14 is activated by the sensing device 12 such as to drop the output voltage of the power source 10 to a very low value within microseconds of an arc detection.

The switching device 14 is optionally implemented as a fast acting solid state switch. The switching speed of the switching device 14 is preferably made to be fast enough to permit a closing of the switch upon an initial occurrence of the fault to limit the damages resulting from the arc fault. For example, the switching device 14 can optionally be implemented as a triggered discharge tube, a triggered spark gap or other similar devices. Any suitable switching/shorting approach may be employed, and the specific manner in which the switching/shorting action is achieved does not affect the system described herein.

The above described system is applicable to various types of power source 10 to load 16 configurations. The power source 10 is a fault-tolerant and preferably regulated type of power source, as will be described further below.

Figure 2:
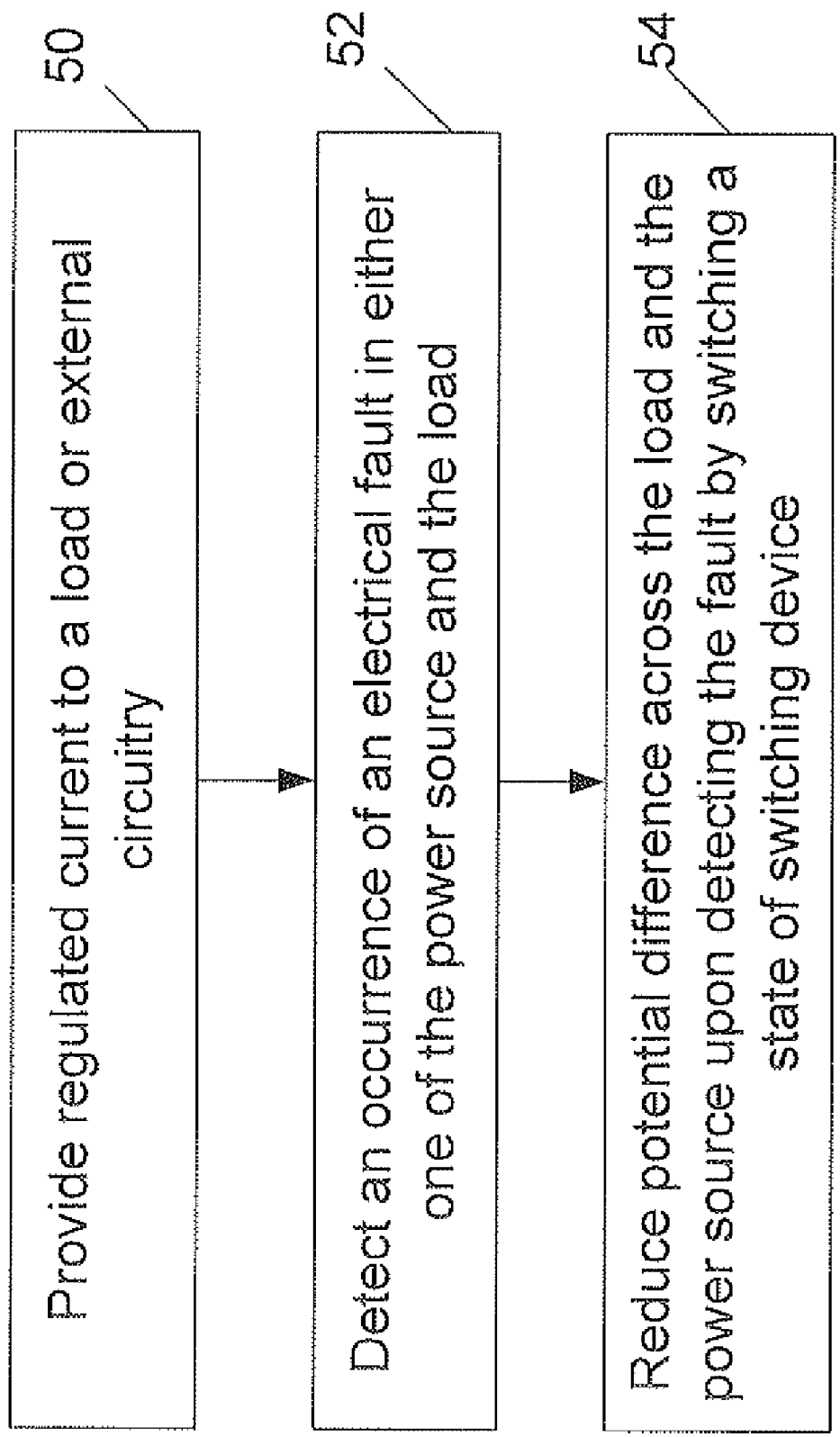
FIG. 2 is a flow chart of a method for mitigating an electrical arc fault according to an embodiment.

Now referring to FIGS. 1 and 2, a method for mitigating an electrical arc fault comprises the following steps.

In step 50, regulated current is provided at an output terminal or any other output means for transmission to a load or any type of external circuitry.

Step 50 is performed by connecting a current regulated electrical power source 10 to the load 16, for example, whereby a potential difference 18 (FIG. 1) is set across load 16.

For example, in FIG. 1, the power source 10 regulates the power distributed to the load 16 and the arc current sensing device 12 is arranged to control the switching device 14.

In step 52, the electrical arc fault is detected by the arc current sensing device 12.

When an electrical fault occurs in the circuitry as shown in FIG. 1 for example, the sensing device 12 detects a characteristic of an arc fault and preferably immediately controls the switching device 14 to turn to a closed state. The sensing device 12 preferably has an arc fault detection circuit capable of detecting an initial occurrence of an arc fault quickly enough to send instructions to the switching device 14 in time for the switch to close and thereby mitigate the effects of the arc fault before significant damage results.

Hence, in step 54, the potential difference 18 at the output terminal is reduced upon detecting the electrical arc fault. This step is preferably performed by switching between the open and the closed state of the switching device when the switching device 14 receives an indication of an arc fault or instructions to change its switching state to another state. For example, a short circuit is produced across both the power source 10, and in this example also across the load 16, when an initial occurrence of an arc fault is detected by the sensing device 12. The switching device 14 closes the output terminal to produce the short circuit within microseconds of the detection of the arc fault. This ensures that very little potential difference 18 is set across the output terminals of the system, across the load 16 and across the power source 10. Both the load 16 and the power source 10 are therefore protected against the damaging effects of the arc fault. Further control and annunciation circuits (not shown) would reduce the output current of the power source and provide a fault indication or annunciation as a slower response to such a fault.

For a power source which is of a regulated current type, the output current from the power source is held at an operational maximum value until control actions are automatically implemented following the detection of the arc fault.

Once the arc fault is extinguished, the power source is optionally reset back to normal operation. Alternatively, the system may remain disabled until some later event, such as a full maintenance inspection, is performed.

In the above "reset" method, the switching device 14 optionally returned to an open state after extinguishing of the arc fault. This can be done in a variety of ways. For example, the sensing device 12 can send a signal to the switching device after a given amount of time. The operation may then return to a normal operation. Any suitable reset approach may be used.

Figure 3:
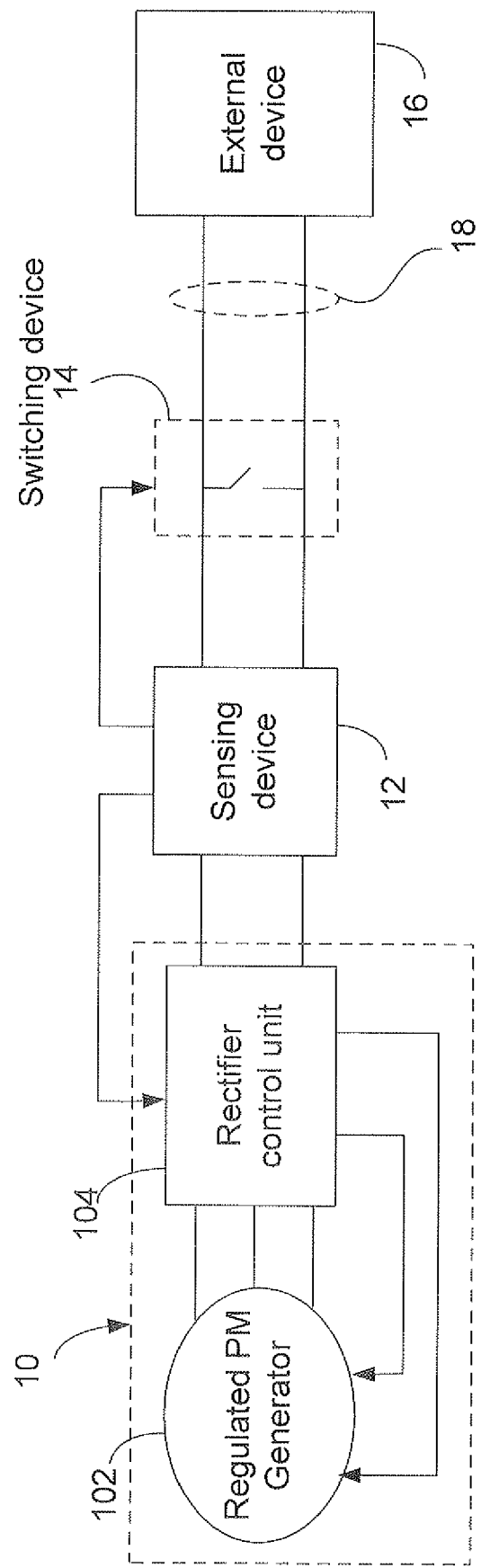
FIG. 3 is a schematic view of the system of FIG. 1 wherein the power source has a rectifier control unit and a regulated permanent magnet (PM) generator.

FIG. 3 illustrates one example of a specific implementation of the system of FIG. 1. in this example, the power source 10 comprises an electrical power generator 102, and a rectifier control unit 104.

Electrical generator 102 preferably comprises a fault tolerant DC generator, capable of sustaining the short circuit condition applied by switching device 14. Examples are generators of the general types described in one or more of applicant's U.S. Pat. Nos. 7,262,539, 6,965,183 and 6,313,560. Still other generator systems may be employed. While most generators may be seriously damaged by short circuiting in this way, high impedance or other fault-tolerant machines/systems of any form could also incorporate the present approach. Therefore, any suitable generator system capable of sustaining a short circuit may be used.

The rectifier control unit 104 has rectifying circuitry and a control circuitry. The rectifier unit 104 is generally conventional and its requirements are linked primarily to the requirements of the specific generator provided, and thus is not addressed herein. In this example, the generator 102 is of the type described in U.S. Pat. No. 7,262,539, and hence the rectifier also feeds the control winding input (as described in the referenced patent) of the generator 102. Still referring to FIG. 3, in use, when an initial occurrence of an electrical fault occurs in the electrical power generator 102, the rectifier control unit 104 or the load 16, it is detected by the sensing device 12. A signal is then sent to the switching device 14 causing the switching device to switch its current state so as to produce a short circuit shunting the DC supply provided at the output of the rectifier control unit 104. The voltage across the load 16 is thus removed or significantly reduced without causing high voltage transients to occur at the power generator 102.

The output current from the power source 10 also remains regulated and under control. When an arc fault is detected, the sensing device 12 controls the rectifier control unit 104 to reduce the power output by the control unit 104 at a much slower rate.

The operating currents can also be returned to the rectifier control unit 104 so as to perform this control. This control action however may take much longer to have an effect than the switching of the switching device 14. Since preventing damage by an arc fault is achieved by removing power to the source and load as quickly as possible, a direct shunting of the power is achieved using the switching device.

Hence, in the above described system and method as illustrated in FIG. 1 to 3, the short circuit has no detrimental effects on the power source 10 (or the rectifier control unit 104 and the generator 102 of FIG. 3) as a result of the selection of an appropriate fault-tolerant system for use therewith. The current output by the power source 10 (or power generator 102 of FIG. 3) is preferably regulated and controlled by the control unit 104, even under fault conditions. The output current is thus limited to the normal operating current values as illustrating in FIG. 4, even under arc fault conditions.

Figure 4:
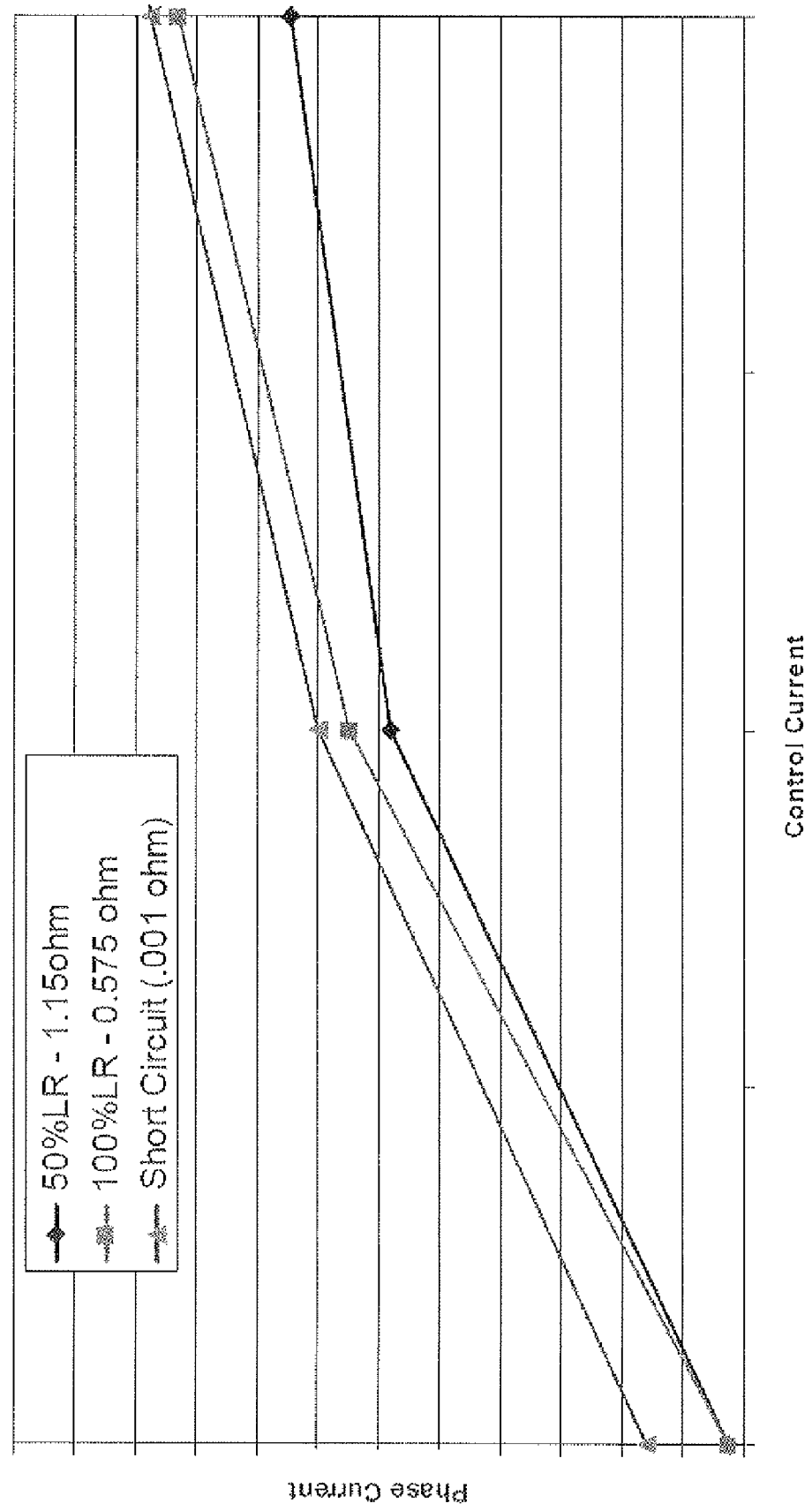
FIG. 4 is a graph illustrating a phase current output by a regulated electrical generator versus a control current provided to the generator by a rectifier control unit protected by the arc fault.

FIG. 4 illustrates the behaviour of the phase currents generated and output by the generator 102, of the type described in U.S. Pat. No. 7,262,539, versus the control current transmitted by the rectifier control unit 104 for three different load resistance values(other generator or power source designs may have different characteristics—FIG. 4 is shown for illustration purposes only). More specifically, the short circuit behaviour is modelled with a very small resistance of 0.001 Ohm. This situation occurs when the switching device 14 is in a closed state or when the potential difference 18 across both the load 16 and the power source 10 is reduced towards zero. From FIG. 4, it is seen that the control current is related to the operational current, which is shown in FIG. 3 to be sent from the sensing device 12 back to the current control unit 104. It is understood that other types of current controlling and power rectifying methods and configurations can be adapted with the system and method herein described. In conventional arc fault systems, reducing the DC current in the circuit in microseconds can result in high voltages being induced in the generator circuit, which may cause additional arc faults or insulation damage. By relying on the beneficial short circuit tolerance characteristics of a suitable generator design, in conjunction with the application of a suitable switching device, an extremely rapid reduction in circuit voltage is possible, and leads to the beneficial result of the present approach.

The embodiments described above are intended to be exemplary only, and are susceptible to modification without departing from the present application. For example, any suitable generator/generation system design may be used. Although a single phase system is schematically depicted, any number of phases may be present. Any suitable arc sensing/detecting approach may be employed. Any suitable switching/shorting technique may be employed. any suitable arrangement of such elements may also be used. The application is therefore intended to be limited solely by the scope of the appended claims.

The invention claimed is:

1. A system for mitigating an electrical fault in a power source, the system comprising:
   a fault-tolerant power source comprising a permanent magnet generator having an output terminal connected with conductors to a load, said power source for providing regulated current to the load;
   an electrical arc fault sensing device for detecting the electrical arc fault in the power source; and
   a switching device across the output terminal for short-circuiting the output terminal to bypass the load and complete a recirculation circuit through the power source, thereby reducing a potential difference at the output terminal upon detection of the electrical arc fault by the electrical arc fault sensing device.

2. The system as in claim 1, wherein the switching device comprises a switch for switching between an open and a closed state based on a control signal from the electrical arc fault sensing device.

3. The system as in claim 2, wherein the electrical arc fault sensing device comprises an electrical arc fault detection circuit for detecting an initial occurrence of an electrical arc fault and for sending the control signal to the switching device to control the switching between the open and the closed state.

4. The system as in claim 2, wherein the closed state is characterized by a closing of the output terminal while the power source still provides for regulated power, thereby reducing the potential difference.

5. The system as in claim 1, wherein the power source comprises an electrical permanent magnet generator for producing electrical power coupled to a rectifier control unit.

6. A method for mitigating an electrical arc fault, the method comprising:
   providing regulated current at an output terminal of a fault tolerant power source comprising a permanent magnet generator with conductors communicating to a load;
   detecting the electrical arc fault in a source circuit of the power source; and
   short-circuiting the output terminal to bypass the load and complete a recirculation circuiting through the power source, thereby reducing a potential difference across the output terminal upon detecting the electrical arc fault.

7. The method as in claim 6, wherein the step of short-circuiting comprises receiving a control signal indicative of a switching state.

8. The method as in claim 6, wherein the step of short-circuiting comprises switching between an open and a closed state of a switch.

9. The method as in claim 8, wherein the step of providing the regulated current comprises receiving an operating current upon detecting the electrical arc fault arid using the operating current to provide a constant current at the output terminal.

10. The method of claim 6, wherein the step of short-circuiting comprises extinguishing the electrical arc fault and then resetting a power source providing the regulated current back to a normal operation.

* * * * *